Dec. 10, 1957 W. H. BLISS 2,816,225

CURRENT CONTROL DEVICE

Filed Feb. 8, 1955

INVENTOR.

Warren H. Bliss

BY Morris [signature]

ATTORNEY.

United States Patent Office 2,816,225

Patented Dec. 10, 1957

2,816,225

CURRENT CONTROL DEVICE

Warren H. Bliss, Princeton, N. J., assignor to Radio Corporation of America, a corporation of Delaware Application February 8, 1955, Serial No. 486,911

7 Claims. (Cl. 250—27)

This invention relates to circuits providing increments of current in response to an input signal, and more particularly to a switching arrangement for circuits of this type.

Precise current control arrangements are useful in conjunction with certain electronic devices. One device that may well utilize such a current control arrangement is an electronic printing device.

Arrangements have been proposed for producing intelligible configurations of alphabetical and numerical characters by means of an electron beam. Means may be provided for selectively producing electron beam images of particular alphabetical and numerical characters. Each of these images may be projected to a preselected position on a fluorescent screen. These images may then be recorded by any means for converting a light image to a permanent image such as photography. This technique may be used to produce printed matter at a very high speed from a coded input signal. This technique may be advantageously used in high speed electronic type setting, recording of coded information derived from computers, and for other applications requiring rapid production of printed matter.

To produce an electron beam image of a selected character and to position this image in a preselected position on a fluorescent screen may require precise deflection of an electron beam in response to a coded input signal. The well known magnetic deflection system may be used. Using this method, the current input to the deflection coils must be precisely controlled in response to the coded input signal.

An object of this invention is to provide a current control arrangement which provides precisely regulated increments of output current over a series of discrete steps in response to an input signal which may have code significance.

Another object is to provide a circuit of the type described including an electronic switching arrangement for providing precise discrete increments of current to said control circuit.

A further object is to provide an electronic switching arrangement which is ready at all times to provide precise increments of current in response to an input signal which may have code significance.

Still a further object is to provide an electronic switching arrangement which provides precise increments of current.

In accordance with this invention the current flowing through a device is regulated by a control system which includes a bus which is maintained at a stabilized potential. The potential of this bus is stabilized by a feedback amplifier. This amplifier derives an input from the bus and controls the current flow through the current utilization device to maintain the potential of the bus constant.

Increments of current flow are provided to momentarily vary the potential of the bus. This change in potential actuates the feedback amplifier to cause a change of increment in current to flow through the current utilization device which brings the potential of the bus back to its stabilized potential. These increments of current flow are provided to the bus through an array of electronic switches. Each of the switches is connected to the bus through a resistor having a precise resistance. Each of these switches and its associated resistor provide a precise increment of current to the stabilizing bus and cause a related increment or step of current to flow through the current utilizing device. Steps of current varying in magnitude can be provided through the current utilizing device in accordance with the combination of switches caused to conduct in response to the input signal. The impedance of the current utilization device circuit and the impedance of the switches may be so arranged that a small increment of current flow flowing through the switch can govern a much greater increment of current flow through the current utilization device.

The increments of current provided by each of the electronic switches are stabilized by being made solely dependent on the precision resistors. This is accomplished by causing the impedance of the switch to be negligible relative to the resistance of the precision resistor when the switch is conducting. The resistance of the precision resistor is stabilized by passing a current through the resistor even when the switch is not conducting. This current flow maintains the resistor at a constant temperature or keeps it warm at all times so that it precisely maintains its resistance value.

The novel features of the present invention will become apparent to one skilled in the art from a reading of the following description in conjunction with the accompanying drawings in which.

Figure 1:
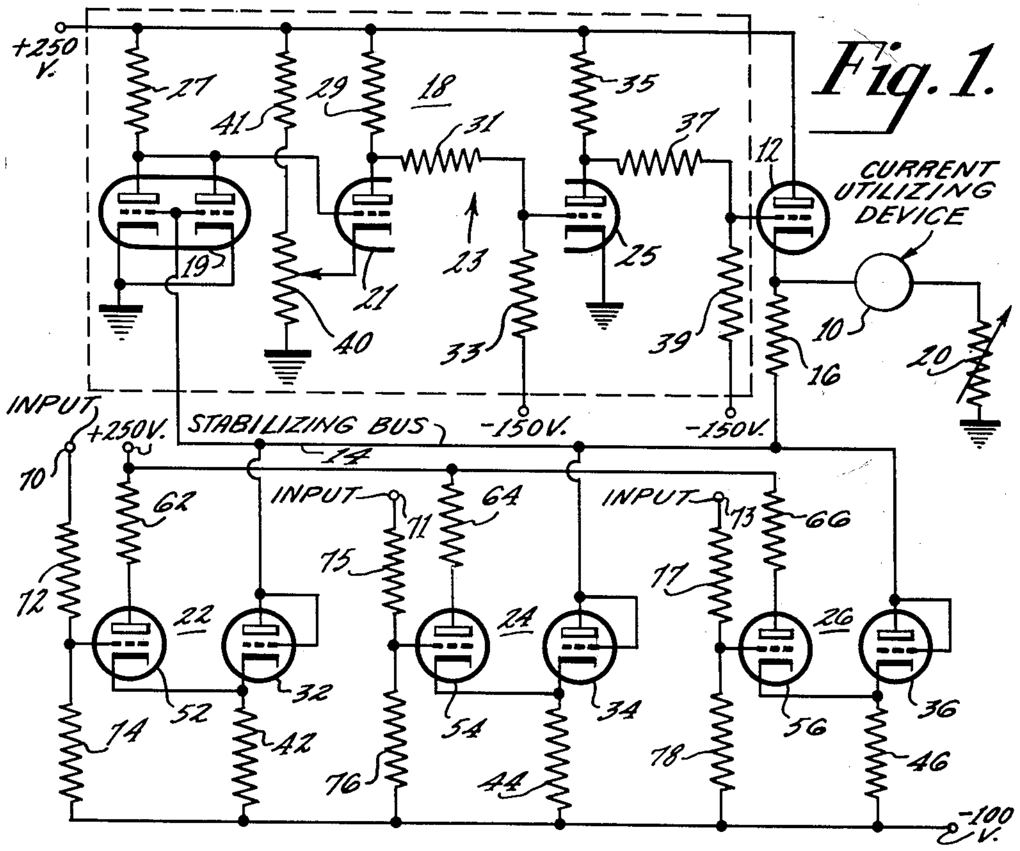
Fig. 1 is a schematic diagram of one embodiment of this invention.

In Fig. 1 a current utilizing device 10 which may be the deflection coil of a character selecting or positioning cathode ray tube is connected in the cathode circuit of a grid controlled triode 12. The cathode circuit of the triode is also connected to a bus 14 whose potential is maintained or stabilized at a predetermined potential. The cathode is connected to this bus through a resistor 16. A feedback amplifier denoted by general reference character 18 is connected to derive an input from bus 14. The output from the feedback amplifier 18 is connected to the grid of triode 12 to control its conduction and thereby control the current flow through the current utilizing device and accordingly control the potential of the stabilizing bus 14. The feedback amplifier is described in detail in the following paragraph.

The feedback amplifier is made up in three stages. The first stage consists of a dual triode 19 which may be, for example, a vacuum tube of 6J6 type with both sections connected in parallel. The output of the first stage is coupled to the grid of triode 21. Triode 21 may be, for example, one-half of a dual triode 23 which may be, for example, a vacuum tube of the 12AX7 type. The output from triode 21 is connected to the grid of the other half 25 of dual triode 23. The output from the final stage of the feedback amplifier 18 is connected to the control grid of the current control tube 12. Sources of potential are provided for biasing the plate and grid circuits of the various amplifier stages. A positive source of potential, for example, 250 volts is provided and a negative source of potential, for example, −150 volts are provided. The plates of triodes 19, 21 and 25 are connected to the +250 volt source through resistors 27, 29 and 35. The plate of triode 21 is coupled to the grid of triode 25 by resistor 31. The plate of triode 25 is coupled to the grid of current control triode 12 by resistor 37. Resistors 33 and 39 respectively bias the grids of triodes 25 and 12 from the −150 volt source. The cathodes of the amplifier vacuum tube stages are connected to ground. The cathode of triode 21, however, is connected to ground through the variable tap of potentiometer 40. Potentiometer 40 and resistor 41 are connected in series. The series-connected potentiometer 40 and resistor 41 are connected from the +250 volt source to ground to operate as a potential divider. The potentiometer 40 provides a means for adjusting the stabilized potential on bus 14.

The current utilizing device 10 is connected from the cathode of triode 12 through a variable resistor 20 to ground. The variable resistor 20 provides a means for adjusting the current flow through the current utilizing device 10.

Steps or increments of current of small magnitude are provided to the bus 14 by an array of electronic switches which are designated by general reference characters 22, 24, and 26. The output current increments flowing through the current utilizing device vary in accordance with these smaller increments of current provided to the stabilizing bus 14. These increments of output current flowing through the current utilizing device are precisely controlled.

This precise control is accomplished by the feedback amplifier 18 acting in conjunction with current control tube 12. If the potential on the bus 14 rises because of a variation in current flow through the current control tube 12, this rise is fed into the feedback amplifier 18 through resistor 16. The feedback amplifier then produces an amplified voltage drop on the control grid of the current control tube 12. This drop acts to reduce the current flowing through the current control tube 12. This in turn reduces the bus voltage back to its stabilized value to maintain a precisely regulated current flowing through the control tube.

When a current increment is provided to the bus, this increment flows through resistor 16. This momentarily varies the stabilized potential of the bus. This causes a change in current flow through the current control tube 12 to once again stabilize the potential of the bus 14. This in turn precisely regulates each increment or step of current flowing through the current utilization device to a discrete precise value. The array of electronic switches and associated precision resistors provides precise increments of current of small magnitude to the bus 14 to cause larger precisely regulated increments of current to flow through the current utilizing device.

Each of the electronic switches includes a pair of control means. One of these control means is a triode having its grid connected to its anode to operate as a diode. Referring to switches 22, 24 and 26, these diodes are designated as diode 32 associated with electronic switch 22, diode 34 associated with electronic switch 24, and diode 36 associated with electronic switch 26. These diodes 32, 34 and 36 have their cathodes connected to precision resistors 42, 44 and 46 respectively. These series-connected diodes and resistors are connected between the stabilizing bus 14 and a source of potential relatively low with respect to the operating potential of the stabilizing bus. This source of potential may be, for example, −100 volts.

Another source of potential is provided which is relatively high with respect to the operating potential of the stabilizing bus 14. This relatively high source of potential may be, for example, +250 volts. Another control means is associated with each of the electronic switches. These control means, for example, are: triode 52 associated with electronic switch 22, triode 54 associated with electronic switch 24, and triode 56 associated with electronic switch 26. Each of these triodes is connected by means of its cathode to draw current through its associated precision resistor. Triode 52 is connected to precision resistor 42, triode 54 is connected to precision resistor 44, and triode 56 is connected to precision resistor 46. These connected triodes and resistors are connected across the +250 volt and −100 volt sources of potential. The connection to the +250 volt source is made through plate resistors 62, 64 and 66 of triodes 52, 54 and 56 respectively.

An input means is connected to each of the electronic switches 22, 24 and 26. An input terminal 70 is provided for receiving an input signal from a code input source, for example (not shown). An input resistor 72 connects the input terminal 70 to the grid of triode 52. Similar input terminals 71 and 73 are respectively connected to the grids of triodes 54 and 56 through resistors 75 and 77. The grid of triode 52 is connected to the −100 volt source of potential by means of biasing resistor 74. The grid of triode 54 is connected to the −100 volt source by means of biasing resistor 76, and the grid of triode 56 is connected to the −100 volt source through biasing resistor 78.

The electronic switches operate in the following manner to provide precise small increments of current to the stabilizing bus 14 to cause corresponding precisely regulated larger increments of current to flow through the current utilizing device 10. The operation of electronic switch 22 is described in detail to describe the cycle of operation of each of these switches. During normal operation when no input signal is provided to triode 52, triode 52 is in a conducting condition. Current, therefore, flows from the +250 volt source through resistor 62, triode 52 and precision resistor 42 to the −100 volt source. This current flow through resistor 42 raises the cathode potential of diode 32 above its plate or anode potential which prevents conduction through this tube 32. In this condition no current is provided to the stabilizing bus 14. The electronic switch 22 is, therefore, in the "opened" condition. Current is flowing at all times through precision resistor 42. This resistor is, therefore, warmed so that its resistance is maintained precisely stabilized at all times in preparation for providing a precise increment of current to the stabilizing bus. When a negative input signal is provided to the grid of triode 52, it cuts off conduction through triode 52. The cathode potential of diode 32 is no longer raised above its anode potential. Current, therefore, now flows through diode 32. This causes an increment of current to flow through the stabilizing bus 14 through diode 32, precision resistor 42 to the −100 volt source. The magnitude of this increment of current provided to bus 14 is dependent substantially entirely upon the resistance of precision resistor 42 because triode 52 is cut off and diode 32 has a negligible anode to cathode impedance in the conductive direction. When the input signal is terminated, triode 52 conducts; and current once more flows from the +250 bolt source to the −100 volt source through resistor 62, triode 52 and precision resistor 42. This current flow once again raises the cathode potential of diode 32 above its anode potential to cut off the flow of current through diode 32. This once again cuts off the flow of current from the stabilizing bus 14.

The triode plate resistor 62 has a resistance selected to provide a current flow through resistor 42 during the switch-opened condition only slightly higher than the flow of current through resistor 42 during the switch-closed condition. This keeps the precision resistor at a substantially constant temperature and maintains its resistance substantially constant.

The values of input potential provided to control the grid of triode 52 which in turn controls electronic switch 22, are not critical. These potentials need not be stabilized as long as they are sufficiently stabilized to maintain triode 52 cut off in one condition and conducting in the other.

Electronic switches 24 and 26 operate in a similar manner to provide precise increments of current flow to the stabilizing bus 14 for switch-closed condition. For the switch-opened condition current flows from the +250 volt source to the −100 volt source through the precision resistors 44 and 46. Input signals or potentials are provided to the grids of triodes 54 and 56 of switches 24 and 26 respectively in a similar manner to the manner previously described.

To provide increments of current having, for example, binary significance to the stabilizing bus 14, resistors 42, 44 and 46 may have different values of resistance. Resistor 42 may have, for example, a resistance of 24,000 ohms. Resistor 44 may have, for example, a resistance of 48,000 ohms and resistor 46 may have, for example, a resistance of 96,000 ohms. With this binary arrangement the currents controlled by switches 22, 24 and 26 respectively are one current unit, two current units and four current units.

The current flow through the current utilizing device 10 is controlled in response to the input signals, which may have code significance, to provide steps or increments of current in accordance with the increments of current provided by the switching devices 22, 24 and 26. When switch 22 is closed, there is a momentary drop of potential on stabilizing bus 14 because of the one unit of current flowing through resistor 42 and resistor 16. This momentary change of input to the feedback amplifier 18 actuates the control grid of current control tube 12 to cause current control tube 12 to draw an additional increment of current. This raises the potential of bus 14 once again to its stabilized or regulated value. The current flow through the current control tube 12, however, has been increased to a new value. This new value of current flows through current utilizing device 10 to ground through variable resistor 20. The increment of current through device 10 proportionally corresponds to the increment of current flowing through precision resistor 42. Similar increments of current are caused to flow through the current utilizing device 10 in response to increments of current flowing through precision resistors 44 and 46 which are controlled by switches 24 and 26 respectively. Since the resistors 42, 44 and 46 have resistance values which are different and have binary significance, they provide when connected to bus 14 either singly or in combination corresponding increments of current flow through current utilizing device 10. These corresponding increments or steps of current flow also have corresponding binary significance.

When electronic switch 22 is closed, an increment of current flows through the current utilizing device 10 which may be considered as one unit of current. When switch 24 is closed, the current utilizing device draws an increment current which is twice the initial increment. When switch 26 is closed, current utilizing device 10 draws an increment current which is four times the initial increment. The current flow through the current utilizing device may be of any magnitude in comparison to the corresponding increment of current flow provided by each of the switches.

In one arrangement, resistor 16 may have a resistance many times greater than that of the resistor 20. This will, therefore, cause a current increment to flow through the current utilizing device which is correspondingly greater than the current increment provided to the bus by a switch or combination of switches. This enables a relatively small flow of current through the switches to control a much larger current flow through the current utilizing device. When the current utilizing device 10 is the character selecting or positioning deflecting coil of a cathode ray tube, very small input signals controlling relatively small increments of current flowing through the precision resistors and switches may control very large current flows through the deflection coil. Embodiments of this invention have used a resistor 16 which is as much as 100 times the resistance of variable resistor 20. This provides an increment of current flow through device 10 which is correspondingly 100 times the value of the increment of current flow provided to bus 14 from the switching array.

By closing different combinations of these three switches, the current drawn through the current utilizing device may be controlled accurately to any one of eight different precisely regulated current steps which may range from zero current units to 7 current units. A multiplicity of output current increments are, therefore, precisely controlled by utilizing various combinations of these low current precision resistors. For any binary arrangement when $n$ switches are used, the input array controls $2^n$ increments of current through the current utilizing device.

Figure 2:
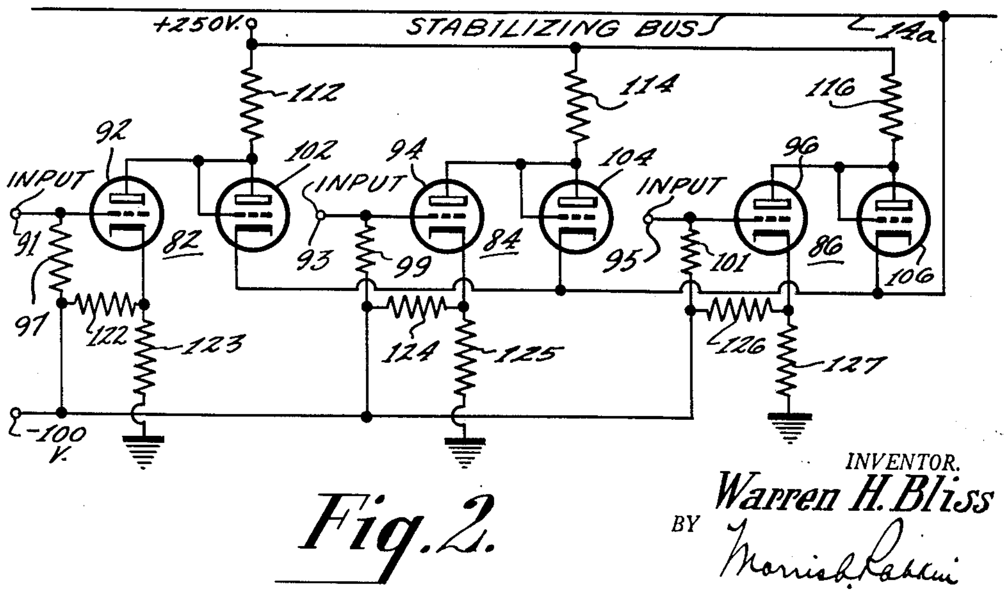
Fig. 2 is a schematic diagram of another embodiment of this invention.

In Fig. 2 is shown a schematic diagram of another embodiment of this invention. Parts shown in Fig. 2 which are identical to parts shown in Fig. 1 are designated by the same reference characters followed by the suffix "*a*." Fig. 2 shows the electronic switching arrangement and the connection from the switching arrangement to the stabilizing bus **14*a*. The feedback amplifier and current utilizing device may be connected to the stabilizing bus 14*a* in an identical manner to that shown in Fig. 1. For purposes of simplicity of presentation and to avoid duplication of description included in reference to Fig. 1, a description of the feedback amplifier, current control tube and current utilizing device associated with stabilizing bus 14*a* is not repeated. The switching arrangement is made up of switches 82, 84 and 86. These switches 82, 84 and 86 each include two current control means. Switch 82 includes a triode 92 and a diode-connected triode 102. These diode-connected triodes have their grids connected to their anodes to provide low anode to cathode impedance in a similar manner to that previously described. As before, the diode-connected triode is referred to as a diode. Switch 84 includes a triode 94 and a similarly connected diode 104. Switch 86 includes a triode 96 and a diode 106 also having a negligible impedance in the conductive direction. In a manner somewhat similar to Fig. 1, diodes 102, 104 and 106 are connected in series with precision resistors 112, 114 and 116 respectively. The precision resistors in Fig. 2, however, are connected to the plates of the diodes instead of the cathodes. The series-connected precision resistors and diodes are connected from a source of potential to the stabilizing bus 14*a* in a manner also somewhat similar to that described in Fig. 1. In this case, however, they are connected from a source of potential relatively high in relation to the operating potential of the stabilizing bus 14*a*. This relatively high source of potential may be, for example, +250 volts. This provides increments of current to bus 14*a*** which flow in a direction opposite to that provided by the switching arrangement shown in Fig. 1.

Triodes 92, 94 and 96 are also connected to draw current through precision resistors 112, 114 and 116 respectively. This results in a connection between the plates of the triode and diode which are included within each of the electronic switches. This connection provides a means for having the respective current flow through triodes 92, 94 and 96 control the conduction of diodes 102, 104 and 106. Triodes 92, 94 and 96 are respectively provided with input terminals 91, 93 and 95 which are connected to the triode grids. The terminals 91, 93 and 95 and their associated grids are connected individually to the −100 volt source through grid resistors 97, 99, and 101 respectively. Resistors 122 and 123 provide a potential divider between the −100 volt source and ground. The cathode of triode 92 is connected to the junction of resistors 122 and 123. This provides proper biasing for triode 92. A similar connection is made to the cathode of triode 94 from the junction of resistors 124 and 125 which provide a potential divider between the −100 volt source and ground. Another similar connection is made to the cathode of triode 96 from the junction of resistors 126 and 127 which also provide a potential divider between the −100 volt source and ground.

The operation of these electronic switches 82, 84 and 86 is explained by a detailed explanation of the operation of electronic switch 82. In the switch-opened condition, the triode 92 is conducting. Current, therefore, flows from the +250 volt source through precision resistor 112 through triode 92 to the junction of resistors 122 and 123. This provides the warming current flow through precision resistor 112. The flow of current through the triode 92 maintains the anode or plate of diode 102 at a potential lower than its cathode potential. This maintains the diode 102 cut off and prevents current flow to the stabilizing bus 14*a*.

When the proper input signal or potential is provided at terminal 91 to the grid of triode 92 to cause it to cut off, the anode potential of diode 102 rises to a value above its cathode potential. This causes diode 102 to conduct. Current, therefore, flows from the +250 volt source through resistor 112 and diode 102 to the stabilizing bus 14*a*. Since diode 102 has a negligible impedance relative to the impedance or resistance of resistor 112 in the conductive direction, the value of current flow provided to bus 14*a* is dependent only on the value of resistor 112. This causes a momentary change in potential of bus 14*a*. This change in potential is opposite in sense to the change in potential caused by the arrangement in Fig. 1 and, therefore, causes changes in current flow through the current utilizing device which are similar to those described in Fig. 1 but opposite in sense. When the input signal cutting off triode 92 is terminated, current once more flows through triode 92 from the relatively high source of potential to the relatively low source of potential. This lowers the anode potential of diode 102 once more below its cathode potential to cut off the current flow to the stabilizing bus.

The arrangement shown in Fig. 2 may have resistors 112, 114 and 116 having resistances which are similar to the resistances of resistors 62, 64 and 66 which are shown in Fig. 1. Because the operation of the switching device shown in Fig. 2 is in all respects similar to that described in conjunction with Fig. 1 with the exception of opposite sense of current flow, the operation is not described in detail.

This current control circuit may be used in various applications where precisely regulated current output increments are provided in response to an input signal. The switching portion is useful in applications where precise increments of current are required. These current increments may be utilized, for example, in the electronic computer field since the operation of the switching device is essentially equivalent to digital-to-analogue conversion.

What is claimed is:

1. A system for providing a precise increment of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, a switching device providing a precise increment of current connected to said bus for momentarily varying said reference potential to cause said system to provide a corresponding precisely regulated increment of output current, said switching device comprising a precision resistor, a current flow controlling device connected to said precision resistor, current drawing means connected to said current flow controlling means, said switching device providing means for connecting said precision resistor through individual alternate paths to said bus and to said current drawing means, and a control means connected to said switching device for passing current selectively through said alternate paths in response to an input signal.

2. A system for providing a precise increment of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, a switching device providing a precise increment of current connected to said bus for momentarily varying said reference potential to cause said system to provide a corresponding precisely regulated increment of output current, said switching device comprising a precision resistor, a current flow controlling device connected to said precision resistor, current drawing means connected to said current flow controlling device, said switching device providing means for connecting said precision resistor through individual alternate paths to said bus and to said current drawing means, a control means connected to said switching device for passing current selectively through said alternate paths in response to an input signal, and said path through said switching device to said bus having a negligible impedance in the conductive direction relative to the resistance of said precision resistor.

3. A system providing a precise increment of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain said but at said reference potential, a switching device providing a precise increment of current connected to said bus for momentarily varying said reference potential to cause said system to provide a corresponding precisely regulated increment of output current, a precision resistor, a current flow controlling device connected in series with said precision resistor, a current drawing means, said current drawing means also being connected in series with said precision resistor to draw current through said precision resistor, said current drawing means being connected to said current flow controlling device to cause said control means and said current flow controlling device to alternately conduct, means for providing an input signal connected to said current drawing means, and said current drawing means including means for causing conduction of said current drawing means to be governed by said input signal.

4. A system for providing a range of precise steps of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, an array of devices providing various combinations of precise increments of current connected to said bus for momentarily varying said reference potential to cause said system to provide corresponding precisely regulated increments of output current, each of said devices comprising a precision resistor, a switching device connected to said precision resistor, current drawing means connected to said switching device, said current drawing means providing means for connecting said precision resistor to said bus, and a control means connected to said current drawing means for passing current selectively through said switching device in response to an input signal.

5. A system for providing a range of precise steps of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, an array of devices providing various combinations of precise increments of current connected to said bus for momentarily varying said reference potential to cause said system to provide corresponding precisely regulated increments of output current, each of said devices comprising a precision resistor, a switching device connected to said precision resistor, current drawing means connected to said switching device, said current drawing means providing means for connecting said precision resistor to said bus over a path to said bus having a negligible impedance in the conductive direction relative to the resistance of said precision resistor, and a control means connected to said current drawing means for passing current selectively through said switching device in response to an input signal.

6. A system for providing a precise increment of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, a switching device providing a precise increment of current connected to said bus for momentarily varying said reference potential to cause said system to provide a corresponding precisely regulated increment of output current, said switching device comprising a precision resistor, a current flow controlling diode connected to said precision resistor, current drawing means connected to said current flow controlling diode, said current drawing means having a control electrode, said switching device providing means for connecting said precision resistor through individual alternate paths to said bus and to said current drawing means, and control means connected to said control electrode of said current drawing means to cause said switching device to pass current selectively through said alternate paths in response to an input signal.

7. A system for providing a range of precise steps of output current to a utilizing device comprising a control means connected to regulate the current flow through said utilizing device, a bus providing a potential reference means, said bus being connected to said utilizing device to cause the potential of said bus to be a function of the current flow through said utilizing device, a feedback amplifier connected to derive an input signal from said bus in response to a change in bus potential, said feedback amplifier having its output connected to said current control means for regulating the current flow through said utilizing device to maintain the potential of said bus at said reference potential, an array of devices providing various combinations of precise increments of current connected to said bus for momentarily varying said reference potential to cause said system to provide corresponding precisely regulated increments of output current, each of said devices comprising a precision resistor, a switching diode connected to said precision resistor, current drawing means connected to said switching device, said current drawing means providing means for connecting said precision resistor to said bus, said current drawing means having a control electrode, and control means connected to said control electrode of said current drawing means for passing current selectively through said switching diode in response to an input signal.

References Cited in the file of this patent

UNITED STATES PATENTS

| | | |
|---|---|---|
| 2,672,552 | Comte | Mar. 16, 1954 |
| 2,683,806 | Moody | July 13, 1954 |